United States Patent
Sarma et al.

(10) Patent No.: US 8,738,606 B2
(45) Date of Patent: May 27, 2014

(54) QUERY GENERATION USING ENVIRONMENT CONFIGURATION

(75) Inventors: Kanchuki Sarma, Kirkland, WA (US); Jeanine Spence, Kenmore, WA (US); Israel Hilerio, Kenmore, WA (US); Eric B. Watson, Redmond, WA (US); Lingan Satkunanathan, Kirkland, WA (US); Mai-Lan Tomsen Bukovec, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/731,619

(22) Filed: Mar. 30, 2007

(65) Prior Publication Data

US 2008/0243827 A1    Oct. 2, 2008

(51) Int. Cl.
*G06F 17/30* (2006.01)

(52) U.S. Cl.
USPC .................................. 707/713; 707/E17.063

(58) Field of Classification Search
USPC ......................................................... 707/2, 3
See application file for complete search history.

(56) References Cited

U.S. PATENT DOCUMENTS

| | | | |
|---|---|---|---|
| 5,103,498 A | 4/1992 | Lanier et al. | |
| 5,255,386 A | 10/1993 | Prager | |
| 5,621,903 A | 4/1997 | Luciw et al. | |
| 5,867,714 A * | 2/1999 | Todd et al. | 717/172 |
| 6,038,560 A | 3/2000 | Wical | |
| 6,484,161 B1 | 11/2002 | Chipalkatti et al. | |
| 6,519,592 B1 * | 2/2003 | Getchius et al. | 707/6 |
| 6,760,717 B2 | 7/2004 | Suda et al. | |
| 6,879,979 B2 | 4/2005 | Hindawi et al. | |
| 7,069,254 B2 | 6/2006 | Foulger et al. | |
| 7,158,966 B2 | 1/2007 | Brill et al. | |
| 2002/0107843 A1 | 8/2002 | Biebesheimer et al. | |
| 2003/0028513 A1 | 2/2003 | Pawar | |
| 2005/0209994 A1 * | 9/2005 | Noro et al. | 707/1 |
| 2006/0064411 A1 | 3/2006 | Gross et al. | |
| 2006/0085750 A1 | 4/2006 | Easton, Jr. et al. | |
| 2007/0162424 A1 * | 7/2007 | Jeh et al. | 707/2 |
| 2008/0059455 A1 * | 3/2008 | Canoy et al. | 707/5 |

FOREIGN PATENT DOCUMENTS

WO    2006124154 A2    11/2006

OTHER PUBLICATIONS

"InQuira", Date: 2004, http://www.inquira.com/pdf/Web_InQuira_6.5.pdf.

(Continued)

*Primary Examiner* — Anteneh Girma
(74) *Attorney, Agent, or Firm* — Henry Gabryjelski; Kate Drakos; Micky Minhas (57) ABSTRACT

A query for a help system includes data about a user system and a task that the user is attempting. The query may be used by a search engine to generate relevant results to aid the user. The user system data may include configuration data about hardware and software. The task data may be derived from the current state of a device, or from operational history that may be developed from a single user or a group of users. The query may have a mechanism to weight various keywords or components of the query and a feedback system may adjust the weights for future queries.

20 Claims, 4 Drawing Sheets (56) References Cited

OTHER PUBLICATIONS

Han, et al., "Intelligent Query Answering by Knowledge Discovery Techniques", http://citeseer.ist.psu.edu/cache/papers/cs/272/ftp:zSzzSzftp.fas.sfu.cazSzpubzSzcszSzhanzSzkddzSziqa95.pdf/han95intelligent.pdf.

Prager, et al., "REASON: An Intelligent User Assistant for Interactive Environments", Date: 1990, vol. 29. No. 1, http://www.research.ibm.com/journal/sj/291/ibmsj2901K.pdf.

Sieg, et al., "Using Concept Hierarchies to Enhance User Queries in Web-Based Information Retrieval", http://maya.cs.depaul.edu/~mobasher/papers/arch-aia2004.pdf.

International Search Report and Written Opinion for PCT Application No. PCT/US2008/055317.

"European Search Report", Mailed Date: Apr. 11, 2011, Application No. EP/08730980, Filed Date: Apr. 6, 2011, pp. 8.

\* cited by examiner

QUERY GENERATION USING ENVIRONMENT CONFIGURATION

BACKGROUND

Getting relevant help to a user is a difficult task. With a vast wealth of information available from many different sources, the difficulty becomes generating a proper filter or query that will yield relevant results.

When a query is sent to a search engine, many results may be returned. Many search engines may rank the results in order of relevance so that the most relevant information is presented to the user first. Some search engines are able to use detailed queries to filter and sort the results to better rank the relevant information.

Because so much information may be available on a topic, creating a detailed and effective query may take a considerable amount of skill to manually select proper search terms. Such a detailed query may take more effort than a typical user may wish to expend in some circumstances.

SUMMARY

A query is generated that includes data about a user system and a task that the user is attempting. The query may be used by a search engine to generate relevant results to aid the user. The user system data may include configuration data about hardware and software. The task data may be derived from the current state of a device or from operational history that may be developed from a single user or a group of users. The query may have a mechanism to weight various keywords or components of the query and a feedback system may adjust the weights for future queries.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Help systems and other databases may be searched using a query that includes configuration parameters and usage data. Configuration parameters may include keywords or other data that describe a user's system or characteristics of a user's system, including parameters about the user himself or herself. Usage data may include the current task being attempted as well as various analyses of operational history of a system.

After generating a query, a search engine may return results for a user to view. Based on user activity and using the results, a learning engine may provide adjustments to a weighting system used to weight various parameters in the query.

The query generator may be used for context sensitive help systems with specialized help databases, but also may be used for general search engine queries, including those initiated by a user as well as those initiated by an automated system. An example of an automated system may be a 'tips of the day' list that is tailored to a particular user and system configuration.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
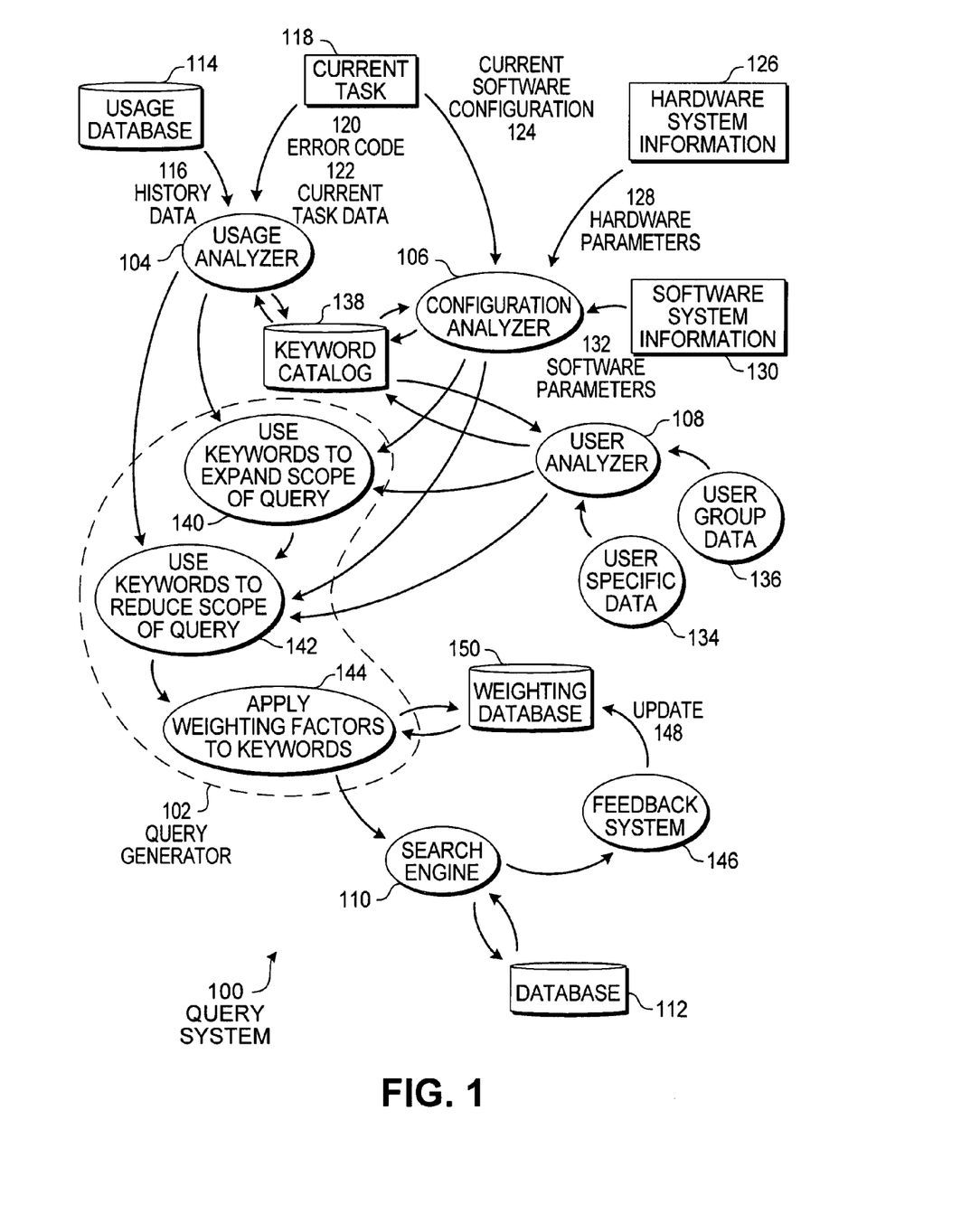
FIG. 1 is a diagram of an embodiment showing a query system.

FIG. 1 is a diagram illustration of an embodiment 100 showing a query system. A query generator 102 uses output from a usage analyzer 104, a configuration analyzer 106, and a user analyzer 108 in building a query. The query is sent to a search engine 110 that references a database 112 to return results. The query may be used in a help system or in a general search for items relating to a task or operation being performed by a user. In some embodiments, the query system may be used to supplement or replace a standard search engine query.

The query generator 102 may be used to enhance a query by providing keywords or other data that may target results for a particular user's system. The keywords or data added by the query generator 102 may be added behind the scenes so that a user may not know about the function of the query generator 102. In other embodiments, the results of the query generator 102 may be presented for a user to edit or change before a query is submitted to a search engine.

The embodiment 100 takes into account a user's usage history, the configuration of hardware and software on the user's system, and certain characteristics about the user to enhance a search query. Such enhancements may return search results that are more relevant to a user's situation than if the enhancements were not used.

The usage analyzer 104 receives history data 116 from a usage database 114 and from the current task 118 receives an error code 120 and any current task data 122. The usage analyzer 104 may add elements to a search query that address both the immediate action being attempted by a user as well as a history of actions the user has performed in the past.

When a user is operating an application on a system, the user may initiate a query from the application by pressing a 'help' button. As part of the query that will be submitted to a help database or a general purpose search engine, usage data about the immediate task being performed by the user may be added to the query. Part of the immediate task data may include an error code 120 if one was encountered, a descriptor of the current task, and other data relevant to the immediate action.

Additional data may be added to the query based on the usage history by the user. For example, if the particular task has been attempted and failed several times in the immediate past, relevant query results may focus on more detailed instructions for executing the current task or troubleshooting options. In such an example, keywords such as "detailed instructions" or "troubleshooting" may be added to a query. If the particular task has not been performed at all or not in a long period of time, relevant query results may include overview descriptions of the task to orient the user, and keywords such as "overview" or keywords that reference a higher level task may be included.

The usage analyzer 104 may add elements to a query in any manner. In some instances, the usage analyzer 104 may use a keyword catalog 138 to add keywords to a search query. Other embodiments may use syntax of a search language that is understandable by a search engine. In some instances, the usage analyzer 104 may be able to define elements that add to the scope of the search as well as other elements that reduce or limit the scope of the search.

The configuration analyzer 106 may generate query enhancements that use the current task 118 as well as hardware system information 126 and software system information 130. The current task 118 may provide current software configuration 124 that may define a current software application that the user is operating, a current user interface, settings for the software application, data entered by the user in the application, or any other information that may be used to refine search results for a query by a user.

The current software configuration data 124 may be used when a user is soliciting help from within an application. Rather than using a built-in help system for an application, a user may use a general purpose search engine for searching for help with the application. The user may be given an option to ignore the current software configuration data 124 when building a search query. When the user chooses to include the information, the current software configuration data 124 may be used to build a query for the general purpose search engine. Otherwise, the user may choose to ignore the configuration data 124 for the query.

The hardware system information 126 may be used to provide hardware parameters 128 to the configuration analyzer 106. Various embodiments may use different hardware parameters 128, including a system type or various hardware descriptors. When performing a search for information regarding a user's device, such as how to operate a specific application, how to upgrade the device, or how to perform a specific function on the device, the configuration analyzer 106 may add details about the device to a search query.

Without the configuration analyzer 106, a user's query for how to start a word processor program may return results from any type of word processor program on any type of device. However, the configuration analyzer 106 may add elements to the search query so that the results are limited or filtered for the particular device. In some cases, the device type may be a general device type, such as a personal digital assistant, mobile telephone, or personal computer. In other cases, the device type may be a specific model number for the device and may include information regarding accessories, processor speed, amount of physical memory, amount of available memory, or any other relevant parameter.

The configuration analyzer 106 may also include software parameters 132 that may include information from operating system parameters to installed software applications, components, add-on features, or any other relevant information. Any relevant information concerning the software configuration of a device may be added to a search query using the configuration analyzer 106.

When each query is generated, the various available query enhancement data such as usage data and configuration data may be culled to find enhancement data that are applicable to the specific search being performed. For example, when a query of a general nature inquiring into available word processing applications, the configuration analyzer 106 may add software parameters 132 that indicate the user's operating system so that available word processing applications for other operating systems would be removed from any results. When a query concerns the modification of a particular setting during installation of a particular suite of software applications, specific details of the operating system, software application suite, and other installed applications may be added.

In some embodiments, a user may be able to select specific keywords to be added for a query. In other embodiments, the user may be presented with an option to select a level of detail or specificity for the query. In still other embodiments, the user may be presented with query results and may be able to select to broaden or narrow the results. When a user selects a level of specificity or to broaden or narrow results, groups of keywords may be added or removed from a query. In some cases, weighting factors for one or more keywords may be adjusted based on the user's specificity selection.

As keywords are created to aid a query, some embodiments may rank, tag, or group keywords for various situations. The groupings, tags, or rankings may be used to adjust the query without having to analyze individual keywords or query expressions. For example, a user may adjust a variable slider or other indicator on a user interface to adjust between broad or narrow. By adjusting the slider, those keywords grouped as 'broad' or 'narrow' may be added or removed appropriately.

In some cases, a system may determine through usage information and other mechanisms that a narrow or broad query is desired. The determination may be through several factors, including the application that may call a query, through artificial intelligence analysis of a user's behavior, from usage history, or other factors. In some cases, such automatic determination may be performed without a user interaction, while in other cases a user may have some control over the determination.

The query enhancements added by the configuration analyzer 106 may be several levels for a particular query. For example, enhancements describing an operating system may include the general operating system class, a general model of the operating system, a specific version of the operating system, the latest patch installed in the operating system, specific settings within the operating system, and any non-standard changes to the operating system. In the example, the data describing the operating system may be provided in a manner that may be tailored for each query. In one query, the general operating system class of a 'server' may be included and other data discarded. In another query, all the data, including any non-standard changes to the operating system may be relevant to the search and thus included.

Which data are included and discarded for a search query may be performed in an automated or manual manner. In an automated manner, the various query terms or keywords may have a weight applied to each term. The weight may be set to zero, indicating that the term is to be ignored in one instance, while in another instance, the weight may be increased so that the term has greater importance. In a manual manner, the user may be given a list of possible additional search terms generated by the usage analyzer 104, the configuration analyzer 106, or the user analyzer 108. The user may be able to check which terms to include and which to remove and may be able to set a priority for terms as a group or individually.

The user analyzer 108 may provide query enhancement data or keywords that describe aspects of the user. The data may come from user specific data 134 or from user group data 136. The aspects of a user may include a user class, the authority or security permissions of a user, and the geographical location of the user. For example, a user may have a security setting that does not permit the user to perform administrative tasks on a device. Thus, a search query performed by the user may exclude articles discussing a particular action that requires administrative privileges.

In some cases, the geographical location of a user may change the relevance of search results. For example, a person in one country may operate a software application that has certain features enabled for the specific country that are not available in another country. Thus, results that include the specific feature may be included for the user and excluded for a user in another country. In another example, a search for the phone number of a local pizza delivery company may be limited to the immediate geographic location of a user.

The user specific data 134 may include data that the user enters to describe himself or herself. For example, a user may answer a series of questions, prioritize a list of topics, select items that describe the user's experience, or other input mechanisms that may be used to describe the user's characteristics or preferences for search materials. In some instances, the user may request to block certain types of search results such as pornography or other types of results.

In some cases, the user data may be applied to a specific user by defining data that are common across groups of users. The user group data 136 may include group information such as access permissions or other user account information as well as any other group affiliation, including social networks, employer groups, sports team affiliations, club memberships, or any other affiliation or group that may have parameters that may be applied to the user.

The usage analyzer 104, configuration analyzer 106, and user analyzer 108 may reference a keyword catalog 138 to generate keywords to be added to a query. In some instances, a different keyword catalog 138 may be used for different search engines to which a query may be sent. For example, a help system for a suite of software applications may have a distinct keyword catalog 138 that is used to cross reference various help topics. A general purpose search engine may use a different set of keywords or descriptors. A specialized search engine may have a special syntax that may be defined in a keyword catalog 138 adapted to the specialized search engine. In many cases, keywords may be defined for various query enhancement parameters while in other cases, enhancement parameters may be defined in a specialized manner or syntax.

The query generator 102 may use keywords to expand the scope of query in block 140, use other keywords to limit or reduce the scope of query in block 142, and apply weighting factors to keywords in block 144.

The query generator 102 may apply Boolean operators to some keywords or parameters. For example, a search may be enhanced by expanding the scope to include searches for a particular set of attempted operations by a user from the usage database 114, but may be limited by restricting or filtering the results to those which match the user's authority to execute from the user specific data 134.

The weighting factors applied in block 144 may come from a weighting database 150 and from analysis of the original query. The weighting database 150 may apply weights or other relevance factors to various terms in a search query. Factors with high relevance may have a high weight while factors with little or no relevance may have a low weight applied. The weights may be applied based on the context of a query. For example, a query that originates from a help button pressed in a specific user interface in a specific software application may have many weighted factors that may narrow results. A general purpose query originating in a web browser may have few factors that are weighted to broaden the results. In some embodiments, a user may be able to specify specific weights for different search term components or to include or remove portions of a query.

After the search engine 110 returns results, a feedback system 146 may provide an update 148 to the weighting database 150. The feedback system 146 may have a user input device where the user rates the relevance of one or more results. In other embodiments, the feedback system 146 may monitor which results were chosen and deduce from the user actions which results were relevant. The feedback system 146 may follow a user's actions when the user uses a result to further determine if the result was useful. For example, if a user selects a result but abandons the result soon thereafter and selects a different result that the user reads for a long period of time, the first result may be assumed to be less relevant than the second. Many different technologies may be applied to track results and determine which results are preferred over another.

Figure 2:
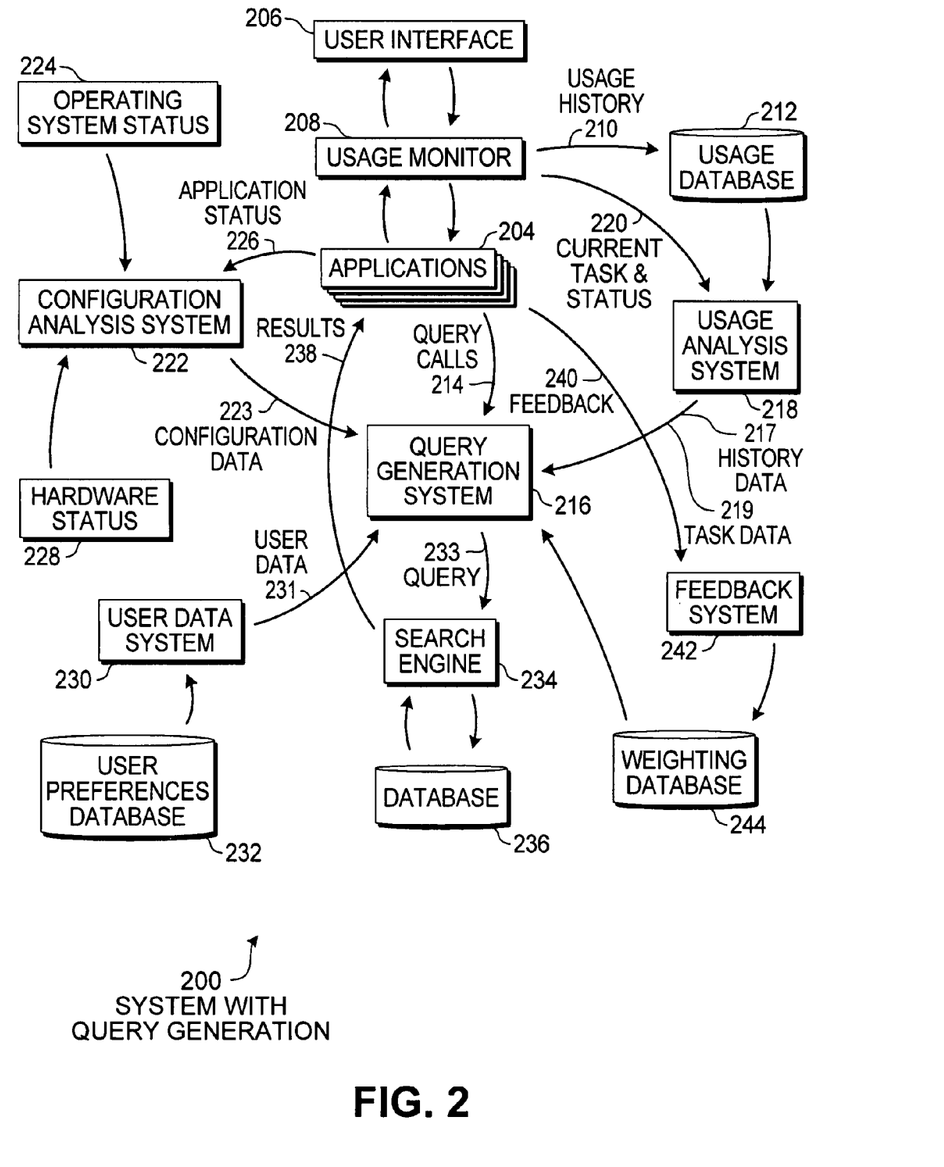
FIG. 2 is a diagram of an embodiment showing a system with query generation.

FIG. 2 is a diagram of embodiment 200 showing a system with query generation. A set of applications 204 interact with a user interface 206, while a usage monitor 208 may track various user actions and log a usage history 210 into a usage database 212.

The applications 204 may create query calls 214 to a query generation system 216. The query generation system 216 may use output from the usage analysis system 218 in the form of history data 217 and task data 219. The usage analysis system 218 may get a current task and status 220 from the usage monitor 208 in order to generate the data. Similarly, a configuration analysis system 222 may use an operating system status 224, application status 226, and hardware status 228 to provide relevant configuration data 227 for a query. A user data system 230 may use data from a user preferences database 232 to provide relevant user data 231 for a query.

The query generation system 216 may make a query call to a search engine 234 that references a database 236 and return results 238 to the calling application. Feedback 240 from the application may be used by a feedback system 242 to update a weighting database 244 that is used by the query generation system 216.

The embodiment 200 is a system that uses various relevant data to build a query for a search engine 234. The various components of the embodiment 200 may be operable on a standalone system or may be provided through network connections to various devices, including over the Internet. For example, the search engine 234 and database 236 may be, in many instances, reached through the Internet and may be continually updated.

The query calls 214 may be made by any type of application 204. In some instances, a query call 214 may be generated as a context-sensitive help call from within an application. In other instances, a query call 214 may be generated through a search application on a desktop, through a web browser, or other type of application.

Some applications may initiate a query call 214 without a user prompt. For example, some applications may have a 'tip of the day' feature that uses a query call 214 to initiate a query that uses usage data, configuration data, and user data to generate a tip of the day that is relevant to the specific user, the user's system, and the user's history of actions. Other applications may generate a recommended reading list or topical list that may be presented on a sidebar or other area of an application that may assist a user at various times while working within an application. Such a list may be generated using the embodiment 200 so that the results pertain to the characteristics of the user and the user's situation.

Figure 3:
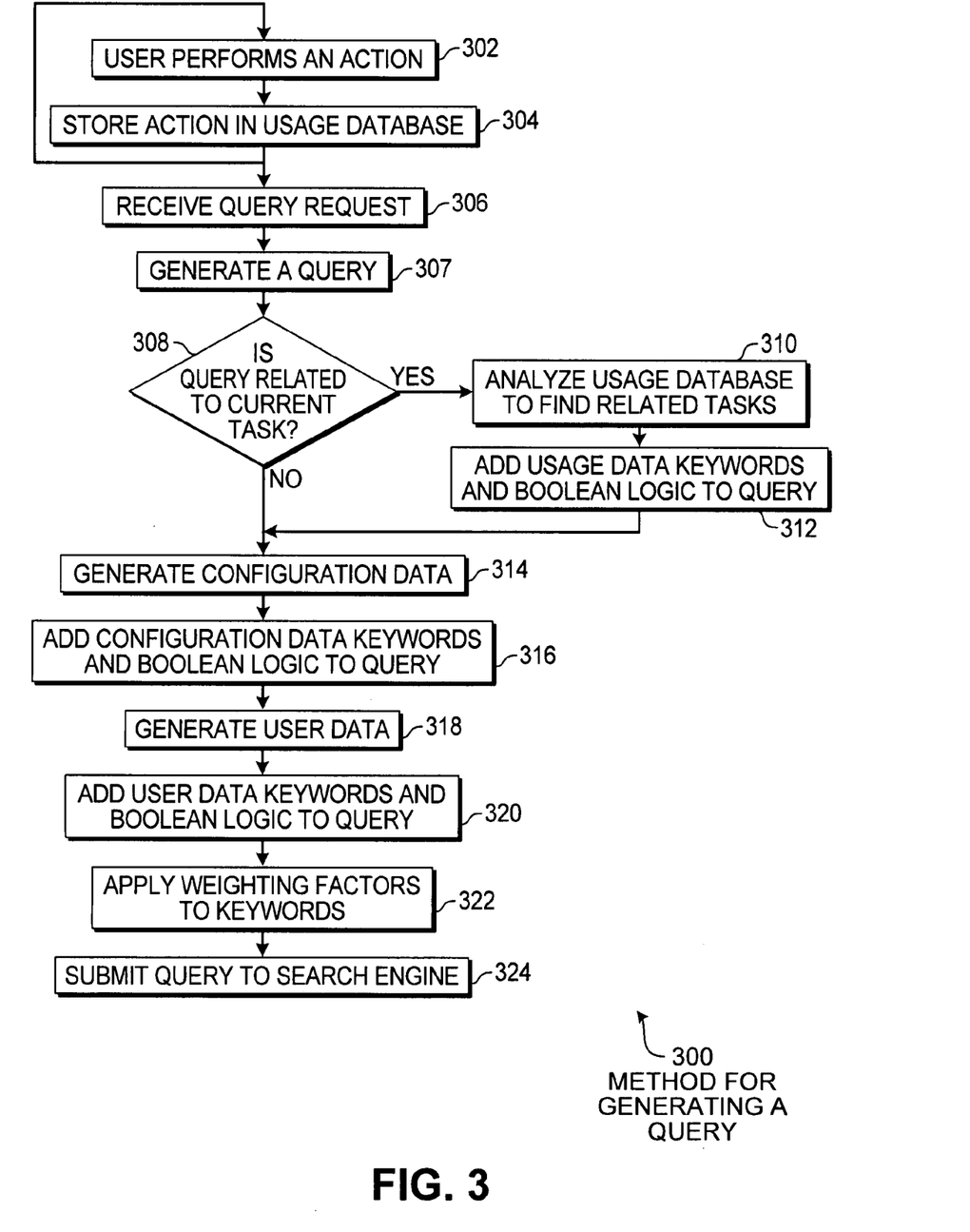
FIG. 3 is a flowchart of an embodiment showing a method for generating a query.

FIG. 3 is a flowchart diagram of an embodiment 300 showing a method for generating a query.

When a user performs an action in block 302, the action is stored in a usage database in block 304. This process may repeat many times.

A query request is received in block 306 and an initial query is generated in block 307. The query request may be from a user action, such as creating a query in a prompt window, selecting a help button, requesting information on a topic, or any user action that may require searching a database. In other cases, a query may be generated by an application without a user prompt. A flag, error message, or other problem indication may be used to initiate a query that may generate results that are presented to a user in response to the problem indication. An application may generate a query to provide context-sensitive information within the application, such as while a user is executing a complex task such as installing a software application or performing a specific action. In still other cases, an application may periodically update a list of topics that may be relevant reading for the user.

If the query is related to the current task in block 308, the usage database is analyzed in block 310 to find related tasks and usage data keywords and Boolean logic are added to the query in block 312.

Configuration data is generated in block 314 and configuration data is added to the query along with Boolean logic in block 316. Similarly, user data is generated in block 318 and user data keywords and Boolean logic are added to the query in block 320.

Weighting factors are applied to keywords in block 322 and the query is submitted to a search engine in block 324. Weighting factors may be applied in any useful manner.

The embodiment 300 is a method by which a query is built using usage data, configuration data, and user data. A query request may include a specific topic that a user wishes to search. As each aspect of usage data, configuration data, and user data is analyzed, various keywords and appropriate Boolean logic may be added to the query. The keywords and Boolean logic may include any scripting language, query language, or other factors that may be interpreted and used by a search engine to find relevant results. In some instances, a query may be a relatively short list of keywords while in other instances, a query may be a complex expression with many arguments.

Figure 4:
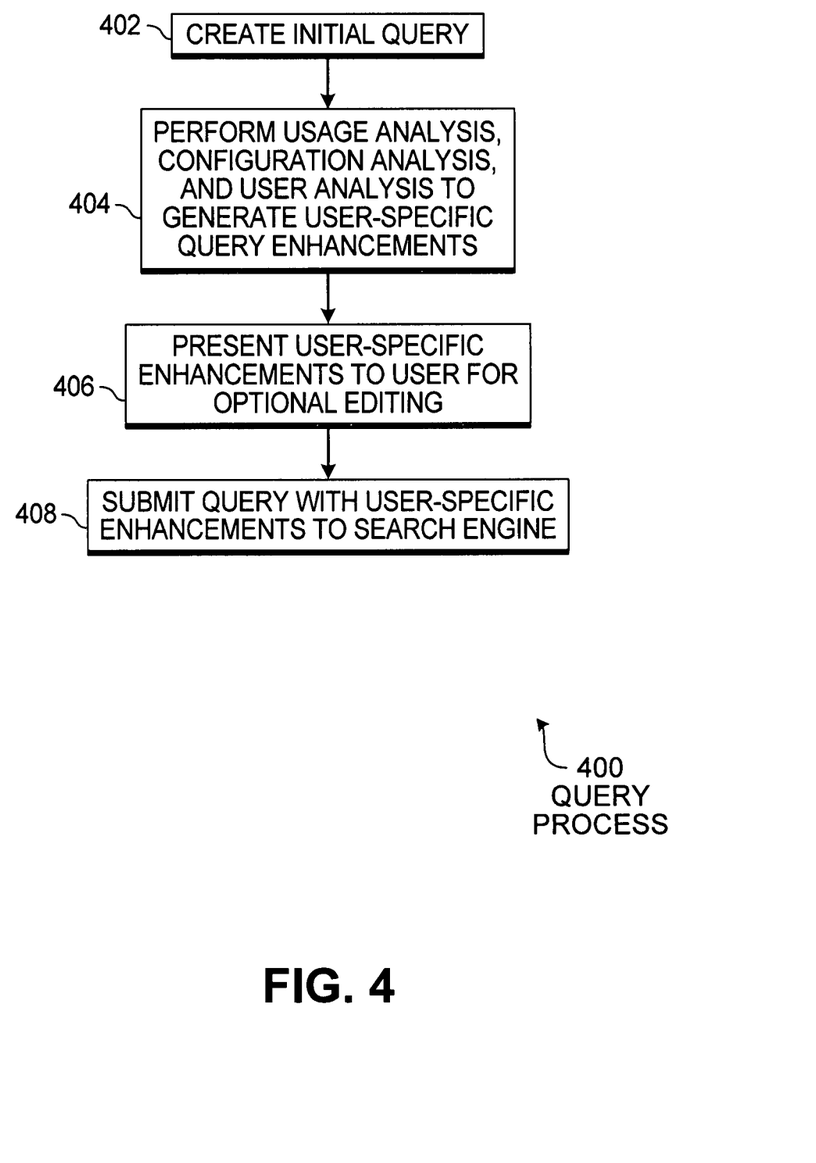
FIG. 4 is a flowchart of an embodiment showing a query process.

FIG. 4 is a flowchart diagram of embodiment 400 showing a method for a query process. An initial query is created in block 402 and user-specific query enhancements are generated in block 404 from usage analysis, configuration analysis, and user analysis. The user-specific enhancements are presented to the user in block 406 for optional editing in block 406 and the query is submitted to a search engine in block 408.

Embodiment 400 is a method by which user-specific query enhancements may be added to a search query and the user may review or edit the enhancements before a query is submitted. The user-specific enhancements may be particular keywords, terms, or search logic that may be created through analysis of user history, hardware and software system configuration, and user characteristics.

In some embodiments, a user may create a query then may be presented with a user interface that displays various user-specific query enhancements for the user to view and edit. In some cases, the user may use a tick mark to select or deselect a keyword. A user may be able to select amongst several options in some cases, edit a text box, or any other mechanism may be used by which a user may edit, change, or otherwise manipulate one or more keywords or other query enhancements. In some instances, a user may be able to edit various logic elements, scripts, or expressions that may be interpreted by a search engine.

In other embodiments, groups of keywords or expressions may be selected or deselected by a user. One mechanism may be for a user to select a degree of specificity or adjust a broad or narrow indicator on a user interface. When such a mechanism is adjusted, groups of keywords may be added or removed, or keywords may have different weightings applied based on the selection.

Such a mechanism may be applied to various portions of a search query. For example, a user may be able to select the relative importance of the user's system configuration, usage data, or user data in returning results. A user may choose to have the query narrowly focused on the user's system configuration but with little importance on the user's descriptive data in the user data category. In some instances, the keywords or query expressions used to modify a query may be grouped or arranged in different manners so that user input or automatic analysis of a query may modify the application of the keywords appropriately.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method implemented at a computer system for adjusting the scope of a query, the computer system including a processor and system memory, the method comprising:
   receiving a query request;
   generating a query in response to the query request, the query for submission to a search engine, the query containing data representative of an initial query scope; and
   the processor adding enhancement data to the query to modify the query prior to submission to the search engine, adding the enhancement data changing the initial query scope to a modified query scope, adding enhancement data including:
      adding task data to the data contained in the query, the task data derived from a task being performed by a user at a user device, the task data comprising a descriptor for the task;
      adding configuration data to the data contained in the query, the configuration data derived from at least one hardware aspect of the user device and at least one software aspect of the user device; and
      adding user data to the data contained in the query, the user data derived from at least one aspect of the user.

2. The method of claim 1, wherein adding enhancement data to query to modify the scope of the query comprises:
   adding a weighting factor for each of the task data, the configuration data, and the user data.

3. The method of claim 1 further comprising:
   submitting the modified query to the search engine;
   receiving a response from the user subsequent to submitting the query, the response relating to a query result provided by the search engine;
   evaluating the response; and
   updating a weighting database based on the response.

4. The method of claim 1, wherein adding task data to the data contained in the query comprises adding at least one of a group composed of: an error code related to the task and a navigation location within an application to the data contained in the query.

5. The method of claim 1, further comprising:
   adding history data to the data contained in the query, the history data derived from actions performed by the user, the history data comprising at least one keyword related to a series of the actions.

6. The method of claim 1, the data comprising a keyword relating to at least one of a group composed of: a user type, a user security access, and a geographic location.

7. The method of claim 1, wherein adding configuration data to the data contained in the query comprises adding at least one of a group composed of: a system type descriptor; a hardware descriptor; a current state of hardware descriptor; a software configuration descriptor; an operating system descriptor; a current state of software descriptor; and a user interface descriptor to the data contained in the query.

8. The method of claim 1, wherein adding enhancement data to the query comprises adding at least one keyword for each of the task data, the configuration data, and the user data to the data contained in the query.

9. The method of claim 1, wherein adding enhancement data to the query to modify the query comprises adding enhancement data to the query to change the initial query scope to a modified query scope, the modified query scope selected from among a group including: an expanded query scope relative to the initial query scope and a reduced query scope relative to the initial query scope.

10. A query system comprising:
    one or more processors;
    system memory;
    a usage analyzer, the usage analyzer configured to derive task data from a task being performed by a user at a user device, the task data including a descriptor for the task;
    a user analyzer, the user analyzer configured to derive user data from at least one aspect of the user;
    a configuration analyzer, the configuration analyzer configured to derive configuration data from at least one hardware aspect of the user device and at least one software aspect of the user device; and
    a query generator, the query generator configured to:
       receive a query for submission to a search engine, the query generated in response to a request from the user, the query containing data representative of an initial query scope; and
       add enhancement data to the query to modify the query prior to submission to the search engine, adding the enhancement data changing the initial query scope to a modified query scope, adding enhancement data including adding the task data, the user data, and the configuration data to the data contained in the query.

11. The system of claim 10, wherein the user analyzer being configured to derive user data comprises the user analyzer being configured to derive user data including at least one of a group composed of: a user type, a security access for a user, and a geographic location for the user.

12. The system of claim 10 further comprising:
    a first database adapted to receive the query and receive results;
    a feedback system, the feedback system configured to receive user input concerning the results and store the feedback in a feedback database; and a weighting system adapted to use at least a portion of the feedback database to produce weights for the usage data and the configuration data.

13. The system of claim 10, the query generator being configured to add enhancement data to the query to modify the query comprises the query generator being configured to add enhancement data to the query to change the initial query scope to a modified query scope, the modified query scope selected from among a group including: an expanded query scope relative to the initial query scope and a reduced query scope relative to the initial scope.

14. The system of claim 13, further comprising the query generator being configured to add a weighting factor for each of the task data, the user data, and the configuration data.

15. A computer program product for use at a computer system, the computer program product for implementing a method for adjusting the scope of a query, the computer program product comprising one or more computer storage devices having stored thereon computer-executable instructions that, when executed at a processor, cause the computer to perform the method, including the following:
  receive a query request;
  generate a query in response to the query request, the query for submission to a search engine, the query containing data representative of an initial query scope; and
  add enhancement data to the query to modify the query prior to submission to the search engine, adding the enhancement data changing the initial query scope to a modified query scope, adding enhancement data including:
    adding task data to the data contained in the query, the task data derived from a task being performed by a user at a user device, the task data comprising a descriptor for the task;
    adding configuration data to the data contained in the query, the configuration data derived from at least one hardware aspect of the user device and at least one software aspect of the user device; and
    adding user data to the data contained in the query, the user data derived from at least one aspect of the user.

16. The computer program product of claim 15, wherein adding configuration data comprises adding configuration data including at least one of a group composed of: a software descriptor and a hardware descriptor.

17. The computer program product of claim 15 further comprising computer-executable instructions that, when executed, cause the computer system to:
  apply weighting parameters to the configuration data and to the usage data added to the query.

18. The computer program product of claim 15, wherein adding usage data comprises adding a current operational state of the user device.

19. The computer program product of claim 15 wherein adding user data to the data contained in the query comprises adding at least one of a group composed of: a user type, a security access for the user, and a geographic location for the user to the data contained in the query.

20. The computer program product of claim 15 wherein computer-executable instructions that, when executed, cause the computer system to add enhancement data to the query to modify the query comprise computer-executable instructions that, when executed, cause the computer system to add enhancement data to the query to change the initial query scope to a modified query scope, the modified query scope selected from among a group including: an expanded query scope relative to the initial query scope and a reduced query scope relative to the initial query scope.

* * * * *